United States Patent
Dinkel et al.

(10) Patent No.: US 12,416,413 B2
(45) Date of Patent: Sep. 16, 2025

(54) COOKING DEVICE WITH AN AUTOMATIC DOOR OPENING FUNCTION AND METHOD OF OPERATING SAME

(71) Applicant: BSH Hausgeräte GmbH, Munich (DE)

(72) Inventors: Alexander Dinkel, Unterwoessen (DE); Michael Heinz, Bad Feilnbach (DE); Bernd Martin, Stein an der Traun (DE); Rainer Lebacher, Palling (DE); Manfred Plankl, Traunwalchen (DE); Matthias Jahner, Waging am See (DE)

(73) Assignee: BSH Hausgeräte GmbH, Munich (DE)

( * ) Notice: Subject to any disclaimer, the term of this patent is extended or adjusted under 35 U.S.C. 154(b) by 603 days.

(21) Appl. No.: 17/779,577

(22) PCT Filed: Dec. 3, 2020

(86) PCT No.: PCT/EP2020/084422
§ 371 (c)(1),
(2) Date: May 25, 2022

(87) PCT Pub. No.: WO2021/122029
PCT Pub. Date: Jun. 24, 2021

(65) Prior Publication Data
US 2023/0003390 A1   Jan. 5, 2023

(30) Foreign Application Priority Data
Dec. 19, 2019   (DE) .......................... 102019220294.2

(51) Int. Cl.
*F24C 7/00*   (2006.01)
*A23L 5/10*   (2016.01)
(Continued)

(52) U.S. Cl.
CPC ................ *F24C 7/085* (2013.01); *A23L 5/15* (2016.08); *F24C 15/02* (2013.01); *A23V 2002/00* (2013.01)

(58) Field of Classification Search
CPC ........ A23L 5/15; F24C 15/02; A23V 2002/00
See application file for complete search history.

(56) References Cited

U.S. PATENT DOCUMENTS 5,290,373 A * 3/1994 Donahue ................. B22C 9/046
                                                         148/702
2008/0148960 A1   6/2008 Berger
(Continued)

FOREIGN PATENT DOCUMENTS

CN   110338643 A1   10/2019
DE   10027774 A1   11/2001
(Continued)

OTHER PUBLICATIONS

Translation for DE10027774 published Nov. 8, 2001.*
(Continued)

*Primary Examiner* — Erik Kashikow
(74) *Attorney, Agent, or Firm* — Michael E. Tschupp; Andre Pallapies; Brandon G. Braun

(57) ABSTRACT

In a method for operating a cooking appliance, a preparation program of the cooking appliance is carried out when preparing an item to be cooked in a cooking chamber of the cooking appliance, while a door of the cooking appliance closes the cooking chamber. The door is automatically opened by a door opening device of the cooking appliance when an end time of the preparation program is reached, and the door is maintained in an open state for a time period determined before opening and/or a time period permanently defined before opening.

18 Claims, 1 Drawing Sheet

(51) Int. Cl.
*F24C 7/08* (2006.01)
*F24C 15/02* (2006.01)

(56) References Cited

U.S. PATENT DOCUMENTS

| | | | | |
|---|---|---|---|---|
| 2012/0060821 A1* | 3/2012 | McNamee | ............. | E05D 15/46 |
| | | | | 126/197 |
| 2012/0152223 A1 | 6/2012 | Sillmen | | |
| 2013/0099715 A1* | 4/2013 | Fuhge | .................... | E05F 15/79 |
| | | | | 318/484 |
| 2019/0003719 A1* | 1/2019 | Wilson | .................... | F24C 7/082 |

FOREIGN PATENT DOCUMENTS

| | | | |
|---|---|---|---|
| DE | 102005011305 | * | 9/2006 |
| DE | 102012105340 A1 | | 12/2013 |
| DE | 102013102293 A1 | | 9/2014 |
| DE | 102015115573 A1 | | 3/2017 |
| DE | 102015115867 A1 | | 3/2017 |
| DE | 102017129320 A1 | | 6/2019 |
| EP | 3399245 A2 | | 11/2018 |

OTHER PUBLICATIONS

Translation for EP3399245 published Nov. 7, 2018.*
Translation for DE102015115867 published Mar. 23, 2017.*
Translation for DE102015115573 published Mar. 16, 2017.*
Translation for DE2013102293 published Sep. 11, 2014.*
Translation for DE102012105340 published Dec. 24, 2013.*
National Search Report CN 202080087873.4 dated Mar. 24, 2025.
National Search Report DE 10 2019 220 294.2 dated Oct. 22, 2020.
International Search Report PCT/EP2020/084422 dated Feb. 2, 2021.

* cited by examiner

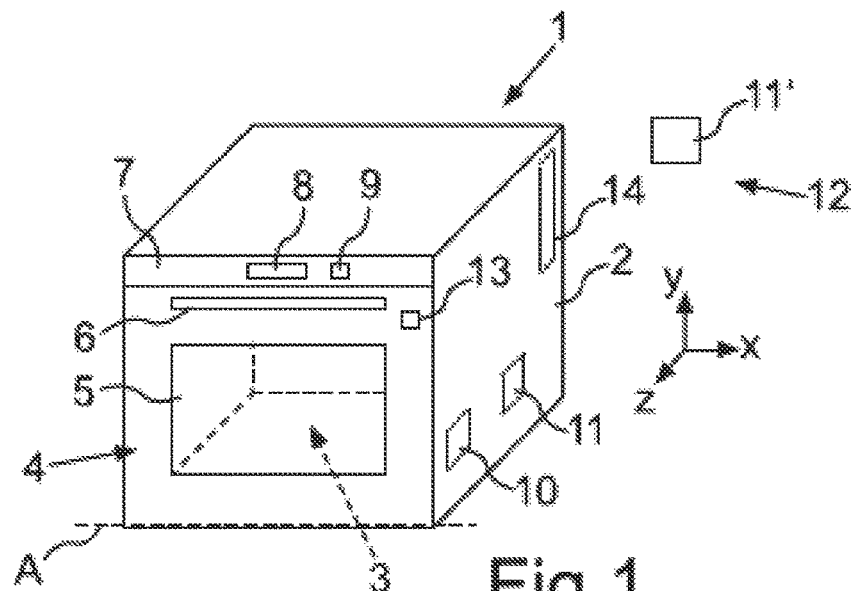
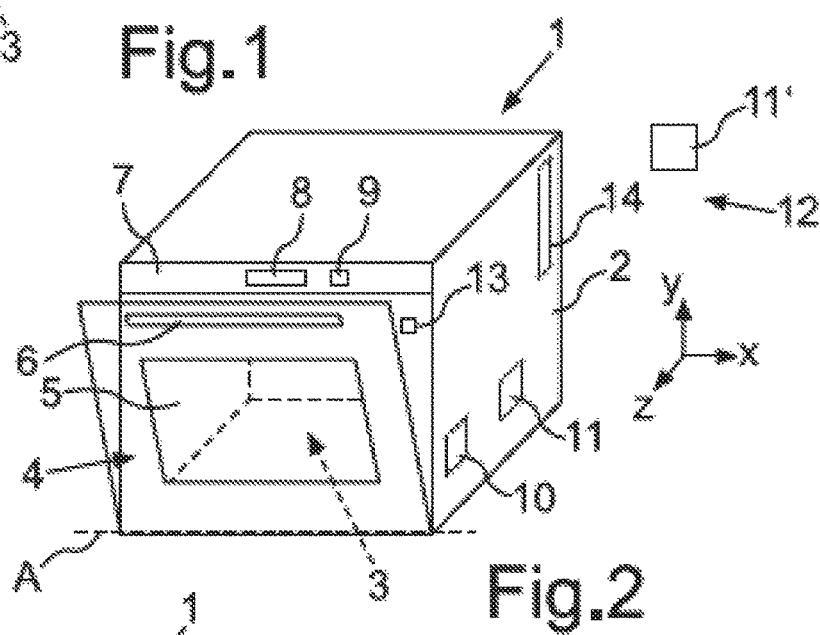
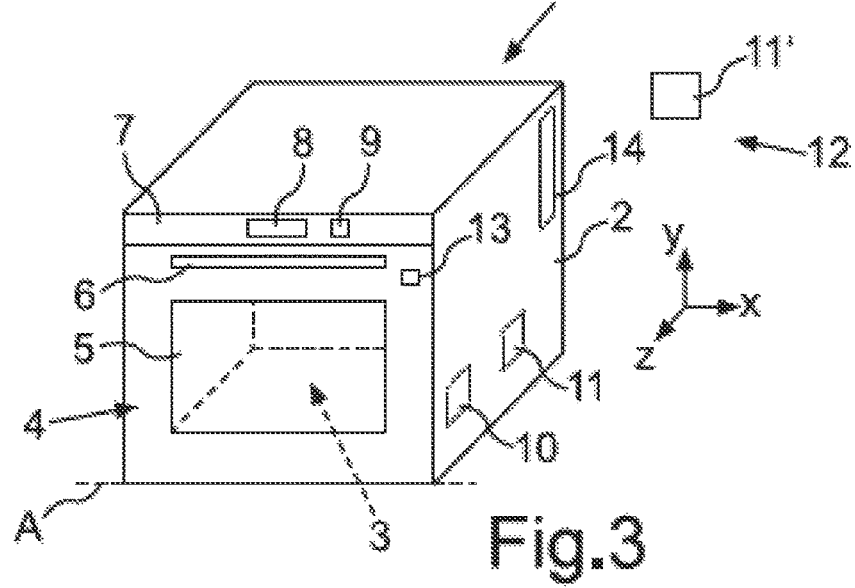

COOKING DEVICE WITH AN AUTOMATIC DOOR OPENING FUNCTION AND METHOD OF OPERATING SAME

CROSS-REFERENCES TO RELATED APPLICATIONS

This application is the U.S. National Stage of International Application No. PCT/EP2020/084422, filed Dec. 3, 2020, which designated the United States and has been published as International Publication No. WO 2021/122029 A1 and which claims the priority of German Patent Application, Serial No. 10 2019 220 294.2, filed Dec. 19, 2019, pursuant to 35 U.S.C. 119 (a)-(d).

The contents of International Application No. PCT/EP2020/084422 and German Patent Application, Serial No. 10 2019 220 294.2 are incorporated herein by reference in their entireties as if fully set forth herein.

BACKGROUND OF THE INVENTION

One aspect of the invention relates to a method for operating a cooking appliance. With this method a preparation program of the cooking appliance is carried out when preparing an item to be cooked in a cooking chamber of the cooking appliance. When an end time of the preparation program is reached, a door of the cooking appliance, which closes the cooking chamber during the preparation program, is opened automatically by a door opening device of the cooking appliance. A further aspect of the invention relates to a cooking appliance.

A method is known from EP 1 714 083 B1, wherein a door is opened automatically to prevent an item to be cooked being cooked further after the end of a cooking program. The temperature in the cooking chamber is captured and after the door has opened automatically it is closed again as soon as the temperature in the cooking chamber drops below a threshold value.

With this known method it is necessary to capture the temperature in the cooking chamber constantly after the door has opened. The sometimes significant turbulence that can occur when the door opens and also afterwards in the cooking chamber means that temperature capture is problematic and imprecise. Door closing is therefore not precise and the items to be cooked can be adversely affected in an unwanted manner if the door is open for too long.

BRIEF SUMMARY OF THE INVENTION

It is therefore the object of the present invention to create a method and cooking appliance with which the automatically opened door operation is improved.

Said object is achieved by a method and cooking appliance as set out in the independent claims.

One aspect of the invention relates to a method for operating a cooking appliance. With this method a preparation program of the cooking appliance is carried out when preparing an item to be cooked in a cooking chamber of the cooking appliance. When an end time of the preparation program is reached, a door of the cooking appliance, which closes the cooking chamber during the preparation program, is opened automatically by a door opening device of the cooking appliance. After opening automatically the door remains open for a time period determined before opening and/or a time period permanently defined before opening. Such an embodiment means that it is no longer necessary to capture the temperature in the cooking chamber with the door in the opened state and to carry out further actuation of the door as a function thereof. Because this time period, for which the door remains open, is determined and/or permanently defined before automatic opening, actuation of the door is improved in this respect. This allows a more precise and appropriate procedure for operating and actuating the door. In particular said determination of the time period is a function of at least one criterion.

Provision is made in particular for a permanently defined time period no longer to be changed after opening. It is therefore fixed or unchangeable in particular regardless of conditions after the opening of the door. Such a provision can also be made for the time period determined before the opening of the door. Provision can however also be made for it to be possible to change this determined time period after opening due to conditions.

In one advantageous embodiment provision is made for the time period permanently defined before the opening of the door to be permanently defined by a user. This is a particularly simple scenario. With this embodiment no complex determination methods are required, which had to be carried out by controlling a cooking appliance.

In a further embodiment provision can be made for the time period permanently defined before the opening of the door to be predefined as a function of the item to be cooked, which is prepared during preparation. To this end provision can be made for specific information to be used relating to the item to be cooked and the time period that the door advantageously remains open for after the end of the preparation program. This can be determined by preceding trials. The resulting knowledge can be stored in the form of a reference table. It can be stored for example in a control unit of the cooking appliance. This means for example that a first time period for said opened state of the door is advantageous for a first item to be cooked when the preparation program has ended.

Provision can also be made for a different second time period to be predefined for an at least second item to be cooked.

Naturally reference can also be made to further items to be cooked, to which individual time periods are assigned.

It is therefore not necessary with the method for the opening time period to be determined while the door is in the opened state. Instead this procedure is set beforehand and concluded at the latest when the door opens. It is also possible in particular for it to be concluded at the latest when the door reaches its opening position. This means a short time period, during which the temperature is determined, can take place as a maximum during pivoting from the closed position to the opened position.

Provision is made in particular for the opening of the door to be started automatically, in particular independently, immediately after the end time of the preparation program has been reached.

In one advantageous embodiment provision is made for the item to be cooked to be identified automatically by a detector of the cooking appliance. Such identification can therefore also take place and the time period for the opening of the automatically opened door can be identified and selected from the advantageously stored reference table independently of a user.

In one advantageous embodiment provision is made for said detector to be a camera.

It is also possible for the nature or type of the item to be cooked to be input into an input unit of the cooking appliance before the preparation program starts or while the preparation program is being carried out.

This can also take place in particular if in one exemplary embodiment the detector of the cooking appliance does not identify the item to be cooked or identifies it incorrectly.

In one advantageous embodiment provision is made for the information relating to the item to be cooked to be imparted by a user to the cooking appliance before the opening of the door.

Provision is made in particular for reference values for time periods for specific items to be cooked to be stored in the cooking appliance and the stored reference value to be selected as a function of the item to be prepared for cooking. This can be presented, as set out above, based on the reference table.

Provision can also be made for the thermal mass to be determined by means of the heating response of the cooking appliance and the item to be cooked during preparation of the item to be cooked and for the time period for the opening of the door to be determined as a function thereof. The thermal mass is also referred to as the heat capacity and represents the quantity of heat a component can absorb during a specific temperature change. The greater the heat capacity, the more energy is required to heat the component.

Provision is made in particular for this specific automatic opening scenario for the door as soon as the end time of the preparation program for the item to be cooked is reached to mean that the item to be cooked is not cooked further in an unwanted manner, thereby influencing the desired cooking state in a negative manner. Because the door opens in this manner as soon as the end time of the preparation program is reached, heat and/or steam can be eliminated from the cooking chamber immediately. This prevents unwanted further cooking of the item to be cooked and substantially maintains the cooking state of the item to be cooked achieved by the preparation program.

In one advantageous embodiment provision is made for a time period that is determined when the door opens and then permanently defined to be determined as a function of the temperature in the cooking chamber when the door opens. The temperature in the cooking chamber is therefore determined at the time when opening starts and the time period for which the door remains open is then determined immediately. This can also take place subject to control by a control unit with such a determination of the temperature in the cooking chamber taking place within a short time interval, for example less than ten seconds, in particular less than five seconds, before the end time is reached. The time period for which the door should remain open after automatic opening can then be determined again as a function of the temperature in the cooking chamber determined immediately before the end time of the preparation program is reached. This is then permanently defined. Provision can also be made for this determination scenario to be concluded before the end time is reached. Provision can also be made for said determination to be started before the end time is reached and to be concluded shortly after the end time is reached, for example less than two seconds, in particular less than one second, after the door starts to open.

In one advantageous embodiment provision is made for the door to be closed again at the end of the permanently defined time period. Such closing in particular takes place automatically. This prevents the cooking chamber cooling down too much and therefore also prevents the item to be cooked being adversely affected in an unwanted manner, in particular being cooled in an unwanted manner, by said opening state of the door.

Provision is preferably made for the temperature in the cooking chamber and/or of the item to be cooked to be captured after the door has closed again and for a heating unit of the cooking appliance to be activated if said determined temperature is below a reference temperature. This also prevents the item to be cooked cooling down in an unwanted manner.

In one advantageous embodiment provision is made for a warming mode of the cooking appliance for keeping the item to be cooked warm in the cooking chamber to be activated after the door has closed again. This warming mode prevents the item to be cooked cooling down in an unwanted manner. The cooking state achieved after the end time of the preparation program is therefore substantially maintained.

In one advantageous embodiment provision is made for the permanently defined time period for which the door is opened to be determined and permanently defined as a function of the type of preparation program. This is also a criterion based on which said permanently defined time period is determined. Such determination therefore also takes place before the end time of the preparation program is reached. As different preparation programs have different lengths and/or produce different states in the cooking chamber, this is also specific information based on which the time period for the door in the opened state can be determined more precisely.

It can also be determined here for example which functional units of the cooking appliance are activated for the preparation program. Functional units can include for example a circulation fan, a heating unit, a grill heating unit, a top heating unit and/or a bottom heating unit, a steam generation unit of the cooking appliance, etc. It is possible to determine the time period for which the door is opened as soon as the end time of the preparation program is reached, as a function of which of said functional units and/or how long said functional units and/or when said functional units were activated during the preparation program.

If the item to be cooked is taken into account for the determination of the time period for the opened door, the type of item to be cooked and/or the form of the item to be cooked and/or the weight of the item to be cooked and/or the composition of the item to be cooked can be taken into account. This can be captured automatically or be input as information by a user.

In one advantageous embodiment provision is made for the vicinity of the cooking appliance in front of the door to be captured using a capture unit before the opening of the door. The opening of the door is controlled by a control unit of the cooking appliance as a function of the captured information. This can prevent the door being opened even though there are objects for example present in the vicinity in front of the door, where the door would pivot. This avoids collision with such objects. In particular it prevents damage to the door and/or such an object. It can also prevent an unwanted effect of temperature on the object as a result of a possibly hot door. In particular if a user is close to the door and optionally looks through a viewing window in the door into the cooking chamber or is located very close to the door above the door, such capture of the person as an object can be advantageous, as it can for example prevent hot steam striking a user who was not expecting the door to open.

In one advantageous embodiment provision can be made in such a situation for a warning to be output before opening. This can be an acoustic signal for example. Additionally or alternatively said signal can also be output optically.

The capture unit can be part of the cooking appliance. It can be a camera for example.

In one advantageous embodiment provision is made for the time of the opening of the door and/or the extent of opening of the door to be determined specifically by a control unit of the cooking appliance as a function of the presence of an object in the vicinity in front of the door. Provision can therefore be made for opening to be initially essentially prevented due to such a situation. However provision can also be made for opening to be started as a function of the position and/or type of object in close proximity to the door or in front of the door but initially with a door opening angle that avoids collision of the door with the object and/or unwanted striking of the object with media that would flow out of the cooking chamber when the door opens.

In one advantageous embodiment provision can be made for the opening angle or extent of opening of the door to be permanently defined. This means that not only is the time period predefined, for which the door remains automatically opened, but also said extent of opening or the opening angle of the door.

In particular the door is arranged on a housing of the cooking appliance in such a manner that it can pivot about an axis. Said axis is preferably a horizontal axis. It is oriented in particular in the widthwise direction of the cooking appliance.

Provision can also be made for the door to be arranged on the housing of the cooking appliance in such a manner that it can pivot about a vertical axis, which is oriented in the heightwise direction.

Provision can also be made for the opening angle or extent of opening of the door to be determined immediately before the opening of the door. In one advantageous embodiment provision is made for it to be possible to change the opening angle of the door at least once as a function of a change criterion when the door is in the opened state. In particular it is changed at least once as a function of the occurrence of said change criterion. This also allows dynamic changing of the position of the opened door. It is thus possible to respond intelligently to changing circumstances.

In one advantageous embodiment provision is made for the end time of the preparation program to be known automatically by the control unit. The total duration of such a preparation program is known and stored. The control unit therefore knows the end time, if the start of the preparation program is known. This can be predefined in each instance by an internal clock of the cooking appliance. Similarly the end time of the preparation program can be known for example by presetting the cooking time and type of heating. Provision can also be made for specific sensors of the cooking appliance to be provided, which are able to determine such an end time of the preparation program or which provide information on the basis of which said end time can be determined by a control unit. Such a sensor can be for example a lambda probe or a humidity sensor or a weight sensor or the like. Such a sensor can also be a meat skewer, which is inserted into a piece of meat that is to be cooked. Similarly capture of the item to be cooked can allow the state to be determined, as a function of which an end time of the preparation program can then be determined. This can be done using a camera for example. This can be used to conclude the end time of the preparation program based on identification of the external state of the item to be cooked. This can involve identification of browning of the item to be cooked for example.

The control unit of the cooking appliance can be incorporated in the cooking appliance itself. However the control unit can also be external. It can be part of a user's communication terminal for example. Such a communication terminal can be for example a mobile radio terminal, for example a smartphone or tablet. Provision can also be made for the control unit to be in the form of a data cloud.

If the control unit is arranged externally in relation to the cooking appliance or outside the housing of the cooking appliance and away from the housing, the temperature in the cooking chamber can also be measured while the door is in the opened state. Said temperature can then also be evaluated at the external control unit and/or be displayed on a display unit of the external control unit. Provision can then also be made for the user to receive a message or signal from the external control unit if the temperature drops below a specific temperature threshold value. The closing of the door can then be prompted. This can be initiated by the user or can take place automatically.

As mentioned above, in certain situations it may be that the opening or partial opening of the door of the cooking appliance can result in contact with hot surfaces. Monitoring the immediate vicinity in front of the door, for example with a sensor, which can be a camera in the spectral range visible to the human eye or in the infrared range, or using another external device, allows such capture. The door opening device, which also has a motor for pivoting the door, can then be activated by a release signal as a result.

Additionally or alternatively this procedure can also be provided for when closing the door automatically. This avoids objects becoming trapped between the door and housing when the door is closed.

The sensors or capture units that are advantageously present can also be arranged externally in relation to the cooking appliance. They can be arranged on an extractor for example. This forms an integral system including the cooking appliance and at least one unit external to the cooking appliance.

Such a capture unit can however also be arranged on the cooking appliance itself, for example on a front operating panel. If the capture unit is arranged externally, information can be exchanged with the cooking appliance by way of a wireless connection. Provision can also be made for the automatic door opening function optionally to be selected or activated in the basic settings of the cooking appliance.

Provision is also made for such a door opening function to be deactivated if a child safety function of the cooking appliance is activated.

A further aspect of the invention relates to a cooking appliance with a housing. A cooking chamber is configured in the housing. Items to be cooked can be prepared in the cooking chamber. The cooking appliance also has a door, which is arranged on the housing in such a manner that it can be moved, in particular pivoted. The door is configured to close the cooking chamber. The cooking appliance is configured to carry out a method according to the abovementioned aspect or an advantageous embodiment thereof. A control unit in particular is provided for this purpose. The control unit can be part of the cooking appliance. However the control unit can also be arranged externally in relation to the cooking appliance. This provides a system, which comprises the cooking appliance and at least this external control unit.

The terms "top", "bottom", "front", "rear", "horizontal", "vertical", "depthwise direction", "widthwise direction", "heightwise direction", etc. refer to the positions and orientations resulting when the arrangement is used and positioned in the correct manner.

Further features of the invention will emerge from the claims, figures and description of the figures. The features and feature combinations cited above in the description as well as the features and feature combinations cited in the following in the description of the figures and/or shown in the figures alone can be used not only in the respectively cited combination but also in other combinations, without departing from the scope of the invention. Therefore embodiments of the invention which are not specifically shown and explained in the figures but will emerge and can be generated from the described embodiments as a result of separate feature combinations are also deemed to be covered and disclosed by the invention. Embodiments and feature combinations which do not therefore have all the features of an originally formulated independent claim should also be deemed to be disclosed. Embodiments and feature combinations, which go beyond or deviate from the feature combinations set out in the claim references, should also be deemed to be disclosed, in particular as a result of the embodiments set out above.

BRIEF DESCRIPTION OF THE DRAWINGS

Exemplary embodiments of the invention are described in more detail below with reference to schematic drawings, in which:

FIG. 1 shows a schematic diagram of an exemplary embodiment of an inventive cooking appliance with a door of the cooking appliance in a closed state;

FIG. 2 shows a diagram according to FIG. 1 but with the door opened automatically; and FIG. 3 shows a diagram according to FIG. 1, in which the door is automatically closed again a time after the state in FIG. 2.

DETAILED DESCRIPTION OF EXEMPLARY EMBODIMENTS OF THE PRESENT INVENTION

Identical elements or those of identical function are shown with the same reference characters in the figures.

FIG. 1 shows a schematic diagram of a cooking appliance 1. The cooking appliance 1 can be an oven for example. The cooking appliance 1 can also be a steam cooking appliance or a microwave cooking appliance. A cooking appliance 1 can also be provided, which combines the functions of an oven, a microwave cooking appliance and a steam cooking appliance.

The cooking appliance 1 has a housing 2. A cooking chamber 3 is configured in the housing 2. It is delimited by walls of a muffle (not shown). The cooking appliance 1 also has a door 4. The door 4 is shown in the closed state in FIG. 1. The front face of the cooking chamber 3 can be closed by the door 4. In the exemplary embodiment the door 4 can be pivoted about an axis. This is a horizontal axis A in particular here. In one exemplary embodiment the door 4 has a viewing window 5 and a handle 6.

In the exemplary embodiment the cooking appliance 1 has a front panel 7. The front panel 7 is configured in particular as separate from the door 4. In the exemplary embodiment it is arranged above the door 4 in the heightwise direction (y-direction). It is in a fixed position on the housing 2. Provision can be made for the cooking appliance 1 to have an operating and/or display unit 8. This can preferably be configured on the operating panel 7. The cooking appliance 1 can also preferably have at least one capture unit 9. This can be configured on the operating panel 7. The capture unit 9 can be at least one camera. The camera can be sensitive in the spectral range visible to the human eye and/or in the infrared range. Multiple capture units 9 can preferably also be provided.

The cooking appliance 1 also has a door opening device 10. Said door opening device 10 can have a motor for example. The door opening device 10 can be used to open the door 4 automatically. Said door 4 can also be closed again automatically by the door opening device 10. The cooking appliance 1 preferably also has a control unit 11. In the exemplary embodiment shown the control unit 11 is arranged in the cooking appliance 1 itself. In an alternative embodiment, also shown in FIG. 1, a control unit 11' can be provided externally in relation to the cooking appliance 1. This can also be a cloud for example. Said control unit 11' can also be a physical device, for example a communication terminal.

If said control unit 11' is arranged externally in relation to the cooking appliance 1, the result is a system 12 comprising said control unit 11' and the cooking appliance 1.

The cooking appliance 1 or system 12 is also configured to carry out a method, which is set out in the following.

During operation of the cooking appliance 1 or system 12 preparation of the item to be cooked is carried out in the cooking chamber 3 of the cooking appliance 1. Preparation involves the carrying out of a preparation program, which can be carried out by the cooking appliance 1. When an end time of the preparation program is reached, the door 4 is then immediately opened automatically. During the preparation program the door 4 is closed. The automatic opening of the door 4 is brought about here by the door opening device 10. Provision is made for the door 4 to remain open for a time period permanently defined before opening. Provision can also be made for the door 4 to remain open for a time period determined during the opening of the door and then permanently defined. With the method therefore there is no further monitoring after the opening of the door to allow the time period to be changed accordingly. In particular there is no provision for a temperature of the cooking chamber 3 to be captured when the door 4 is in the opened state and for the time period for which the door 4 remains open to only be determined as a function of said temperature.

Provision can also be made for the time period permanently defined before the opening of the door 4 to be permanently defined by a user. Provision can also be made for the time period permanently defined before the opening of the door 4 to be predefined as a function of the item to be cooked that is being prepared during preparation.

Additionally or alternatively provision can also be made generally speaking for the time period permanently defined before the opening of the door 4 to be predefined as a function of the type of preparation program which is or has been selected or has already started to prepare the item to be cooked.

Provision can be made for the item to be cooked to be identified automatically by a detector 13 of the cooking appliance 1, in particular in the cooking chamber 3, in particular if the item to be cooked has already been introduced into the cooking chamber 3.

Provision can also be made for the information relating to the item to be cooked to be imparted by a user to the cooking appliance 1. This takes place in particular before the automatic opening of the door 4 and therefore before the end time of the preparation program has been reached. Such an input can take place here for example by means of a voice signal. The operating and/or display unit 8 is therefore also configured to receive voice signals and/or to output voice signals. Provision can however also be made for said information to be input manually by actuating input elements, which can be part of the operating and/or display unit 8.

Provision can also be made for reference values for time periods for specific items to be cooked to be stored in the cooking appliance 1, in particular in the control unit 11 or 11'. Said associated stored reference value is assigned and selected as a function of the item to be prepared for cooking.

Provision can also be made for the thermal mass to be determined during preparation of the item to be cooked based on the heating response of the cooking appliance 1 and the item to be cooked and for said time period for the opening of the door 4 to be determined and permanently defined as a function thereof.

If, starting from the diagram in FIG. 1, the end time of the preparation program has now been reached, the door 4 is opened automatically according to the diagram in FIG. 2. Provision can be made here for a fixed extent of opening or opening angle to be set. This can be a few degrees relative to the vertical position according to FIG. 1.

Starting from the diagram in FIG. 2 provision is made for automatic closing of the door 4 at this end of this predefined opening time period. FIG. 3 shows the door 4 back in the closed state again.

Provision can be made for this permanently defined time period to be determined as a function of the temperature in the cooking chamber 3, for the temperature to be determined immediately before the end time of the preparation program is reached and/or to be determined when the end time of the preparation program is reached.

Provision can be made for the temperature in the cooking chamber 3 and/or of the item to be cooked in the cooking chamber 3 to be captured after the door 4 has closed again, as shown in FIG. 3. A heating unit 14 of the cooking appliance 1 is activated as a function of a comparison between said actual temperature and a reference temperature. After the door 4 has closed a warming mode of the cooking appliance 1 in particular is activated to keep the item to be cooked warm in the cooking chamber 3. In one advantageous embodiment provision is made for a vicinity of the cooking appliance 1 immediately in front of the door 4 to be captured using a capture unit, for example the capture unit 9, before the opening of the door 4 when the end time of the preparation program is reached. The opening of the door 4 is controlled as a function of the captured information. This can mean that such opening can be carried out without restriction. However if there are objects present in said vicinity, the opening of the door 4 can be prevented or delayed. Additionally or alternatively provision can also be made for the opening angle or extent of opening to be adjusted. In particular this should avoid damage to such an object.

The same observation scenario can also be carried out if the door 4 is to be closed again starting from the situation in FIG. 2. The region between the door 4 and cooking chamber 3 can be correspondingly captured for example. The capture unit 9 for example can also be provided for this purpose. The capture unit 9 can for example also be configured as a fisheye camera here and elsewhere.

It is also possible generally speaking for the opening angle of the door 4 to be permanently defined and/or to be determined before the opening of the door 4 and/or to be changed at least once as a function of a change criterion when the door 4 is in the opened state. Such a change criterion can be for example an object in the vicinity of the door 4, which could impede the movement and/or position of the door 4 and/or could itself be damaged by the door 4. A change criterion can also be for example the temperature and/or the quantity and/or the humidity of the medium that escapes from the cooking chamber 3 when the door 4 is opened.

The invention claimed is:

1. A method for operating a cooking appliance, the method comprising:
    executing an automatic preparation program of the cooking appliance to prepare an item to be cooked in a cooking chamber of the cooking appliance, wherein the cooking chamber remains closed by a door of the cooking appliance during execution of the automatic preparation program;
    automatically opening the door by a door opening device of the cooking appliance in response to reaching an end time of the automatic preparation program;
    maintaining the door in an open state for a time period determined before opening and permanently defined before opening,
    capturing with a capture unit information about a vicinity of the cooking appliance in front of the door before opening of the door; and
    controlling opening of the door as a function of the captured information.

2. The method of claim 1, wherein the time period permanently defined before opening of the door is permanently defined by a user.

3. The method of claim 1, wherein the time period permanently defined before opening of the door is predefined as a function of the item to be cooked, which is prepared during preparation.

4. The method of claim 3, further comprising automatically identifying the item to be cooked by a detector of the cooking appliance.

5. The method of claim 3, further comprising imparting an information relating to the item to be cooked by a user to the cooking appliance before opening of the door.

6. The method of claim 1, further comprising:
    storing reference values for time periods for specific items to be cooked in the cooking appliance; and
    selecting a stored one of the reference values as a function of the item to be prepared for cooking.

7. The method of claim 1, further comprising:
    determining a thermal mass by a heating response of the cooking appliance and the item to be cooked during preparation of the item to be cooked; and
    determining the time period for opening of the door as a function of the thermal mass.

8. The method of claim 1, further comprising determining the time period as a function of a temperature in the cooking chamber.

9. The method of claim 8, wherein the time period is determined as a function of a temperature in the cooking chamber at the end time.

10. The method of claim 1, further comprising closing the door at an end of the time period.

11. The method of claim 8, further comprising:
    closing the door at an end of the time period;
    subsequently capturing the temperature in the cooking chamber and/or of the item to be cooked; and
    activating a heating unit of the cooking appliance when the captured temperature is below a reference temperature.

12. The method of claim 11, further comprising activating a warming mode of the cooking appliance for keeping the item to be cooked warm in the cooking chamber after closing of the door.

13. The method of claim 1, further comprising specifically predefining by a control unit a time for opening the door and/or an opening angle of the door as a function of a presence of an object in the vicinity in front of the door.

14. The method of claim 13, wherein the opening angle of the door is permanently defined for the opened state of the door and/or the opening angle of the door is determined immediately before opening and/or the opening angle of the door is changed at least once as a function of a change criterion when the door is in the opened state.

15. A cooking appliance, comprising:
- a housing including a cooking chamber for preparing an item to be cooked in accordance with an automatic preparation program;
- a door arranged on the housing and configured to move between an open state, in which access is provided to the cooking chamber, and a closed state, in which access to the cooking chamber is prevented and the cooking appliance is configured to carry out the automatic preparation program; and
- a door opening device configured to automatically open the door in response to reaching an end time of the automatic preparation program and to maintain the door in the open state for a time period determined before opening and permanently defined before opening,
- a capture unit configured to capture information about a vicinity of the cooking appliance in front of the door; and
- a control unit communicating with the capture unit to control opening of the door as a function of the captured information.

16. The cooking appliance of claim 15, further comprising a detector configured to automatically identify the item to be cooked.

17. The cooking appliance of claim 15, further comprising a heating unit which activates a warming mode to keep the item to be cooked warm in the cooking chamber when a temperature in the cooking chamber and/or of the item to be cooked is below a reference temperature.

18. A cooking appliance comprising a control unit configured to carry out the method of claim 1, wherein the cooking appliance further comprises:
- a housing including the cooking chamber for preparing the item to be cooked in accordance with the automatic preparation program;
- the door arranged on the housing and configured to move between an open state, in which access is provided to the cooking chamber and a closed state, in which the cooking appliance is configured to carry out the automatic preparation program.

* * * * *